US008460431B2

(12) United States Patent
Günther

(10) Patent No.: US 8,460,431 B2
(45) Date of Patent: Jun. 11, 2013

(54) METHOD AND SYSTEM FOR REGENERATING AN AMINE-CONTAINING SCRUBBING SOLUTION OBTAINED DURING GAS PURIFICATION

(75) Inventor: Lothar Günther, Geretsried (DE)

(73) Assignee: MT-Biomethan GmbH, Zeven (DE)

( * ) Notice: Subject to any disclaimer, the term of this patent is extended or adjusted under 35 U.S.C. 154(b) by 429 days.

(21) Appl. No.: 12/682,308

(22) PCT Filed: Aug. 12, 2008

(86) PCT No.: PCT/EP2008/006615
§ 371 (c)(1),
(2), (4) Date: Apr. 9, 2010

(87) PCT Pub. No.: WO2009/092403
PCT Pub. Date: Jul. 30, 2009

(65) Prior Publication Data
US 2010/0282074 A1    Nov. 11, 2010

(30) Foreign Application Priority Data
Oct. 9, 2007  (DE) ................. 10 2007 048 565

(51) Int. Cl.
*B01D 19/00* (2006.01)
(52) U.S. Cl.
USPC .......... 95/9; 95/172; 95/173; 95/174; 95/192; 95/208; 95/227; 95/228; 95/235; 95/236; 95/247; 95/249; 95/266

(58) Field of Classification Search
None
See application file for complete search history.

(56) References Cited

U.S. PATENT DOCUMENTS

| | | | | |
|---|---|---|---|---|
| 4,609,384 | A * | 9/1986 | Ranke et al. | 95/246 |
| 7,666,813 | B2 * | 2/2010 | Hoefer et al. | 502/401 |
| 7,699,914 | B1 * | 4/2010 | Morrow et al. | 96/234 |
| 2005/0000360 | A1 * | 1/2005 | Mak et al. | 95/236 |
| 2006/0196357 | A1 | 9/2006 | Menzel | |
| 2007/0006731 | A1 * | 1/2007 | Menzel | 95/236 |
| 2007/0028774 | A1 * | 2/2007 | Rochelle | 95/236 |
| 2007/0077188 | A1 | 4/2007 | Katz et al. | |
| 2010/0083696 | A1 * | 4/2010 | Hoang-Dinh et al. | 62/611 |

FOREIGN PATENT DOCUMENTS

| | | |
|---|---|---|
| WO | 2004052511 A1 | 6/2004 |
| WO | 2004085036 A2 | 10/2004 |
| WO | 2005044955 A1 | 5/2005 |

* cited by examiner

*Primary Examiner* — Duane Smith
*Assistant Examiner* — Pankti Patel
(74) *Attorney, Agent, or Firm* — Laurence A. Greenberg; Werner H. Stemer; Ralph E. Locher

(57) ABSTRACT

A method for regenerating an amine-containing scrubbing solution which is obtained during gas purification and in which $CO_2$ and sulfur compounds are chemically bonded, as well as a system that is suitable for carrying out the method. The contaminated scrubbing solution is heated, compressed, and expanded in several stages such that $CO_2$ and sulfur compounds are separated. The expanded scrubbing solution is subdivided into two partial streams, and one partial stream is recirculated into the process.

9 Claims, 1 Drawing Sheet

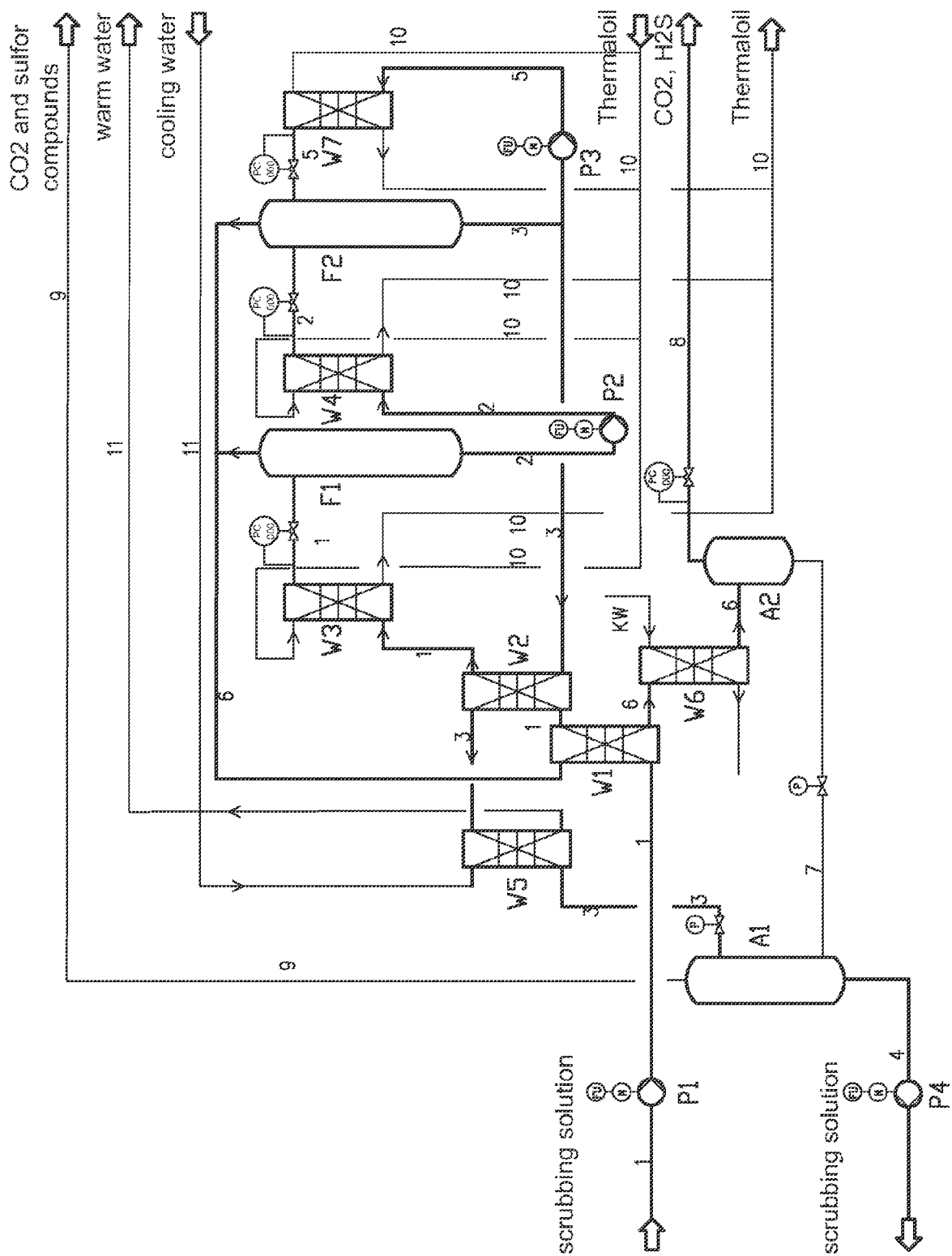

METHOD AND SYSTEM FOR REGENERATING AN AMINE-CONTAINING SCRUBBING SOLUTION OBTAINED DURING GAS PURIFICATION

BACKGROUND OF THE INVENTION

Field of the Invention

The invention relates to a method of regenerating an amine-containing scrubbing solution which is obtained during gas purification and in which the $CO_2$ and sulfur compounds are chemically bound, as well as a system that is suitable for carrying out said method. Various gases, such as biogas, waste gases from chemical processes, refinery gas or associated gas, contain $CO_2$ and sulfur compounds which must be removed by scrubbing before these gases are used for further purposes or discharged into the atmosphere. Methods of carrying out this process include physical or chemical gas scrubbing methods in which a chemical scrubbing is carried out preferably using an amine-containing scrubbing solution in which separated $CO_2$ and sulfur compounds are chemically bound. For reasons of economy it is advantageous to regenerate the contaminated, amine-containing scrubbing solution to enable it to be re-used in the circuit.

DE 10 2005 051 952 B3 describes a method of regenerating an amine-containing scrubbing solution in connection with the production of methane and liquid carbon dioxide from refinery or biogas in which only $CO_2$ is bound. In this method a contaminated scrubbing solution discharging from an absorption column is compressed to 65 bar and heated in a heat exchanger to a temperature of approximately 175° C. About 10% of the carbon dioxide in the scrubbing solution already passes into the gaseous phase under these conditions. Over 99% percent of the carbon dioxide is removed from the scrubbing solution by further heating the scrubbing solution to a temperature from 209° C. The scrubbing solution is subsequently conducted into a desorption column in which the remainder of the carbon dioxide is removed with the addition of further heat. The regenerated scrubbing solution is then gradually cooled to 10° C. with the recovery of the waste heat.

The disadvantages of the method are the high operating pressure and the high temperatures. The latter lead to losses of scrubbing solution and increase the risk of the solution's degrading. The purified scrubbing solution still contains small amounts of impurities which can have a negative effect when re-used.

BRIEF SUMMARY OF THE INVENTION

The aim of the invention is to devise a method of regenerating an amine-containing scrubbing solution which is obtained during gas purification and in which the $CO_2$ and sulfur compounds are chemically bound, and to provide a more economical mode of operation and produce an extremely pure scrubbing solution.

In addition, a suitable system for carrying out the method is to be devised. The aim is achieved in accordance with the invention by the features specified in the independent method claim. Advantageous developments of the method and a system suitable for carrying out the method are recited in various additional claims.

The contaminated scrubbing solution is heated to a temperature of at least 110° C., if necessary to 135° C., preferably to 125° C., and compressed to a pressure of at least 4 bar, preferably 6 to 12 bar, and subsequently expanded in a first expansion stage, preferably to a pressure of 1 to 8 bar, with the major proportion of $CO_2$ and sulfur compounds removed as a gas stream from the scrubbing solution (process step a)).

The scrubbing solution extracted is subsequently heated to a temperature of at least 130° C., if necessary to 160° C., preferably 145° C. and compressed to a pressure at least 4 bar, preferably 5 to 8 bar, and expanded in a second expansion stage to a pressure which is at least 0.5 bar, if necessary up to 3 bar, higher than the expansion pressure of the first expansion stage, with the major proportion of the $CO_2$ and sulfur compounds still present removed as a gas stream from the scrubbing (process step b)). In the first and second expansion stage the expansion preferably takes place as a flash expansion.

The scrubbing solution removed in the second expansion stage is cooled to a temperature below 70° C. and expanded to normal pressure in a third expansion stage in which residual amounts of soluble $CO_2$ still present are separated and this partial stream is cooled to normal temperature as a completely purified scrubbing solution (process step c)).

The scrubbing solution removed after the first expansion stage and/or second expansion stage is subdivided into two partial streams. One partial stream is returned in the circuit to the respective expansion stage and its temperature and pressure adjusted to the conditions of the associated expansion stage. During the expansion, residual amounts of sulfur compounds still present are removed from this partial stream The other partial stream that has not been removed from the circuit is further processed in accordance either with process step b) or c).

The scrubbing solution removed from the circuit is compressed to a pressure of 5 to 10 bar for example and heated to a temperature which is at least 2 to 10° C. higher than the operating temperature in the respective expansion stage.

Residual amounts of soluble $CO_2$ and sulfur compounds still present are removed in the second expansion stage. Under the conditions obtaining (temperature and pressure) the $CO_2$ escaping from the scrubbing solution is re-dissolved in the third expansion stage. The scrubbing solution has now attained its maximum degree of purity. After the scrubbing solution has cooled to normal temperature, it can be returned to the scrubbing circuit to remove the $CO_2$ and sulfur compounds from the biogas.

The method proposed enables the contaminated scrubbing solution loaded with different substances to be regenerated at comparatively low pressures and temperatures because of the multi-level pressure and temperature-controlled expansion planned. Furthermore, the amount of water in the scrubbing solution is retained because proportions of evaporated water removed by the vapors can be returned to the purified scrubbing solution after condensation.

The multi-stage expansion of the contaminated scrubbing solution enables a more selective removal of $CO_2$, $H_2S$ and COS (organic sulfur compounds) to be carried out. The amount of water escaping with other substances from the scrubbing solution during the individual flash expansions, which is caused by the different pressure and temperature conditions, can be significantly reduced. Since the heat of evaporation of water is 5 times greater than that of the constituents to be removed from the gases, the amount of energy required for the necessary regeneration can be considerably reduced.

The gas mixture composed of carbon dioxide, water and sulfur compounds removed as vapors in the expansion stages in accordance with the process steps a) and b)) is used as a heat carrier for heating the contaminated scrubbing solution, and is cooled in the process to normal temperature.

The purified scrubbing solution obtained in the second expansion stage is used as a heat carrier for heating the contaminated scrubbing solution.

This provides a method that is particularly advantageous in energy terms, and also provides hot water.

Condensed water is removed from the gas mixture (vapors) cooled to normal temperature in a separator. A dosed amount of this water is mixed with the completely purified scrubbing solution to maintain the required amine content.

The gas stream ($CO_2$ and sulfur compounds) removed in the first and second expansion stage can if necessary be desulfurized in a downstream desulfurization plant.

The reaction times in the first expansion stage can be further reduced by subjecting the scrubbing solution to ultrasonic treatment. The dwell or reaction time in this stage can therefore be reduced by up to approximately 30% with the same removal performance. Using the same method, a third or fourth expansion stage can be arranged downstream of the second expansion stage.

The pH of the purified scrubbing solution can be measured and used as a control variable for setting the temperature of the contaminated scrubbing solution in the expansion stages.

Within an expansion stage, the ratio of the partial stream removed from the circuit to the amount of contaminated scrubbing solution fed in is 0.2 to 5.

The planned removal from the circuit of a partial amount of scrubbing solution in the first and/or second expansion stage has the following advantages:

The removal from the circuit of a small partial stream enables an economic holding operation to be maintained with a low amount of energy consumption. In addition, the partial stream, the pressure and the temperature of the partial stream circuit can be adjusted to the amounts of sulfur compounds in the biogas and used as a control variable.

The high degree of purity of the regenerated scrubbing solution has further advantages when used additionally for purifying biogas.

The scrubbing solution formed has a capacity to remove up to and over 85 g/l of carbon dioxide and up to and over 15 g/l of sulfur compounds. The same amount of $CO_2$ can therefore be removed with a smaller amount of scrubbing solution and, most importantly, a larger amount of sulfur compounds than before can also be removed. Because of this smaller amounts of hydrocarbons are also dissolved in the scrubbing solution with the smaller amount of scrubbing solution. The methane losses arising with this method are therefore around under 0.05%. The use of smaller amounts of scrubbing solution reduces energy consumption.

A system suitable for carrying out the method comprises a circulation line for conveying the scrubbing solution into which are integrated in the direction of flow a first pump, at least one heat exchanger, at least two expansion devices connected in series and a first separator. A second pump and a downstream heat exchanger are integrated into the circulation line between the first and second expansion device. Downstream of at least one of the expansion devices a pipe loop branches off from the circulation line, said pipe loop being connected to the expansion device for removing from the circuit a partial quantity of purified scrubbing solution and returning it to the expansion device. A third pump and a further heat exchanger are integrated into the pipe loop.

At the head of the expansion devices a line is arranged for removing the vapors, said line being connected to a second separator for removing the condensed water. At least one heat exchanger is integrated into this line for cooling the vapors. The second separator is connected to the first separator via a line for conveying the condensed water in dosed amounts.

Three heat exchangers connected in series are arranged upstream of the first expansion device for the gradual heating of the contaminated scrubbing solution to the required operating temperature. The first heat exchanger is integrated into the line conveying the vapors and the second heat exchanger is integrated into the line conveying the purified, hot scrubbing solution. The third heat exchanger can be heated by an external heat carrier and switched on intermittently. This heat exchanger is used as a rule only during the starting-up phase.

The system proposed can be used for a wide range of outputs and has a high degree of energy efficiency.

BRIEF DESCRIPTION OF THE DRAWING

The invention is now to be explained by an execution example. The associated drawing shows the flow chart for a system for regenerating a contaminated scrubbing solution in which $CO_2$ and sulfur compounds are bound as impurities.

DESCRIPTION OF THE INVENTION

The system can, for example, be part of a biogas processing plant in which $CO_2$ and sulfur compounds contained in the biogas are removed by amine scrubbing. The impurities of $CO_2$ and sulfur compounds must be removed from this scrubbing solution to enable it to be re-used.

The contaminated scrubbing solution obtained (approximately 9 m³/h) with an amine concentration of 40%, at a temperature of 38° C. and a loading of 85 g $CO_2$/l and 6 g $H_2S$/l is conducted via the line 1 and conducted via the circulation pump P1 over three heat exchangers, W1, W2 and W3 connected in series, and heated gradually in said heat exchangers to approximately 65° C. and subsequently up to approximately 125° C., and compressed to a pressure of 7.5 bar. The hot, contaminated scrubbing solution then passes into a first flash expansion device F1 (first expansion stage) where it is expanded to a pressure of approximately 4.5 bar. Approximately 60% of the chemically bound impurities (carbon dioxide and sulfur compounds) in the scrubbing solution are released during the expansion process within a post-reaction time of less than 400 seconds and a reaction temperature of approximately 125° C., and are removed at the head of the flash expansion device F1 as vapors via the line 6. Under these conditions the proportion of chemically bound $CO_2$ in the scrubbing solution is reduced from 85 g/l to 40 g/l and that of sulfur compounds from 6 g/l to 4 g/l. The partly purified scrubbing solution is henceforth fed to a further heat exchanger W4 by the pump P2 via the line 2, heated by thermal oil as a heat carrier to a temperature of approximately 140° C., compressed to a pressure of 6.5 bar, conducted into a second flash expansion device F2 (second expansion stage) where it is expanded to a pressure of approximately 5.5 bar. During the flash expansion the proportions of chemically bound $CO_2$ are reduced from 40 g/l to 22 g/l and those of sulfur compounds from 4 g/l to 2.5 g/l. The separated impurities are removed at the head of the flash expansion device F2 as vapors via the line 6, followed by a further pressure reduction from 5.5 to 4.5 bar. This significantly reduces the water content in the vapors, thereby reducing the overall energy required for purifying the scrubbing solution. At the bottom of the plant the purified scrubbing solution is removed via the line 3 and subdivided into two partial streams. The branch line 3b is constructed as a loop line which is led back to the flash expansion device F2. A pump P3 and a heat exchanger W7 are integrated into this circulation line 3b, said heat exchanger being heated by thermal oil as a heat carrier. A partial stream of scrubbing solution (18 m³/h) is therefore continuously pumped via the line 3b circulated. The temperature of the scrubbing solution circulated is maintained constantly at approximately 145° C. by means of the interposed heat exchanger W7. Under these conditions the proportion of chemically bound $CO_2$ in the scrubbing solution is reduced from 22 g/l to 8 g/l and that of sulfur compounds from 2.5 g/l to 0.9 g/l. The scrubbing solution produced therefore has a loading capacity of 77 g/l for removing carbon dioxide and 5.1 g/l for removing sulfur compounds. If necessary, an additional flash expansion stage (not shown) can be fitted downstream, enabling the loading capacity of the scrubbing solution to be slightly increased.

The ratio between the partial stream removed from the circuit and the amount of contaminated scrubbing solution fed in via the line 1 is 0.2 to 5. The amount of scrubbing solution (9 m³/h) removed via the partial stream line 3a at a temperature of approximately 145° C. is conducted through the heat exchanger W2 and used at the same time as a heat carrier for heating the contaminated scrubbing solution, thereby being cooled to approximately 68° C. The scrubbing solution is further cooled in a downstream heat exchanger W5 by means of cooling water (to 22° C.) and conveyed into the separator A1 in a pressure-regulated manner. A further pressure reduction takes place in this separator from 4.5 bar to normal pressure. This causes a dissolution of the $CO_2$ still chemically bound, enabling a maximum possible degree of purity of the scrubbing solution to be attained. The gas mixture ($CO_2$ and sulfur compounds) streaming off at the head of the separator A1 is removed via the line 9.

The gas mixture, composed of carbon dioxide, water and sulfur compounds and removed at the head of the flash expansion devices F1 and F2 as vapors via the line 6, is conveyed over the heat exchanger W1 and used as a heat carrier for heating the contaminated scrubbing solution, being cooled in the process to a temperature of approximately 60° C. The gas mixture is then cooled to normal temperature (approximately 25° C.) in a downstream heat exchanger W6 by means of cooling water and conducted into the separator A2. Condensed water conveyed in a dosed amount via the line 7 into the separator A1 is deposited in said separator and mixes with the completely purified scrubbing solution in the separator. The gas stream composed of carbon dioxide and sulfur compounds is removed via the line 8. The operating pressure in the separator A2 corresponds approximately to the pressure in the flash expansion device F1 (approximately 4.5 bar).

The completely purified scrubbing solution (9 m³/h), which accumulates in the separator A1 and is free of $CO_2$ and sulfur compounds, is fed to the gas scrubber of the biogas processing plant by means of the pump P4 via the line 4. The pH of the purified scrubbing solution is monitored in the line 4 and the amount of condensed water fed in by the line 7 is adjusted if necessary.

The scrubbing process can be carried out at a clearly higher specific performance than that of the known method because of the high loading capacity of the amine-containing scrubbing solution. Accordingly, smaller specific amounts of scrubbing solution are required for the scrubbing process. Since hydrocarbons (the methane contained in the biogas) dissolve only to a limited extent in the scrubbing agent, smaller amounts of hydrocarbons are dissolved when smaller amounts of scrubbing agents are used so that the purified biogas contains a higher proportion of methane.

The solution proposed for regenerating the contaminated scrubbing solution also provides an energy efficient mode of operation since only the heat exchangers W3, W4 and W7 need to be heated by means of externally fed in thermal oil as heat carriers, with the heat exchanger W3 as a rule only being put into operation during the start-up phase. The thermal oil is fed in and led off via the lines 5. The heat exchangers W1 and W2 are heated by means of the hot vapors formed in the process or the purified scrubbing solution. In addition, hot water is produced by waste heat recovery in the heat exchangers W5 and W6 which can be used for other purposes, e.g. as a heat exchanger medium in the processing of biogas. The cooling water is fed in and led off as hot water via the lines 10.

The gas streams ($CO_2$ and sulfur compounds) are led off via the lines 8 and 9 and used for another purpose.

The invention claimed is:

1. A method of regenerating an amine-containing scrubbing solution obtained during gas purification and having $CO_2$ and sulfur compounds chemically bound therein, the method which comprises:
   a) heating a contaminated scrubbing solution to a temperature of at least 110° C. and compressing to a pressure of at least 4 bar, subsequently expanding the scrubbing solution in a first expansion stage, and removing a major proportion of $CO_2$ and sulfur compounds from the scrubbing solution as a gas stream to form a partially regenerated scrubbing solution;
   b) heating the partially regenerated scrubbing solution obtained in step a) to a temperature of at least 130° C. and compressing to a pressure of at least 4 bar, and expanding the partially regenerated scrubbing solution in a second expansion stage to a pressure that is at least 0.5 bar higher than an expansion pressure of the first expansion stage, and removing a major proportion of the $CO_2$ and sulfur compounds still present from the partially regenerated scrubbing solution as a gas stream;
   c) cooling the scrubbing solution removed in the second expansion stage to a temperature below 70° C. and expanding to standard pressure in a third expansion stage, and removing residual amounts of soluble $CO_2$ still present, and cooling to standard temperature as a completely purified scrubbing solution;
   d) removing condensed water from the gas mixture (vapors) cooled to standard temperature, and mixing the condensed water at a dosed amount with the completely purified scrubbing solution; and
   e) dividing the scrubbing solution removed after the first expansion stage or the second expansion stage into first and second partial streams, and returning the first partial stream in the circuit to the respective expansion stage and adjusting a temperature and a pressure thereof to conditions of the associated expansion stage, wherein residual amounts of sulfur compounds still present are removed from the first partial stream during the expansion and the second partial stream is further processed in accordance with step b) or step c).

2. The method according to claim 1, which comprises using a gas mixture composed of $CO_2$, water and sulfur compounds removed in the expansion stages as vapors in steps a) and b) as a heat carrier for heating the contaminated scrubbing solution and cooling the gas mixture to standard temperature.

3. The method according to claim 1, which comprises compressing the contaminated scrubbing solution, prior to expansion, to a pressure of 6 to 12 bar and expanding during the expansion to a pressure of 1 to 8 bar.

4. The method according to claim 1, which comprises carrying out a flash expansion in the expansion stages of steps a) and b).

5. The method according to claim 1, which comprises using the purified scrubbing solution obtained in the second expansion stage as a heat carrier for heating the contaminated scrubbing solution.

6. The method according to claim 1, which comprises desulfurizing a gas stream removed in the first and second expansion stage in a downstream desulfurization plant.

7. A method of regenerating an amine-containing scrubbing solution obtained during gas purification and having $CO_2$ and sulfur compounds chemically bound therein, the method which comprises:
   a) heating a contaminated scrubbing solution to a temperature of at least 110° C. and compressing to a pressure of at least 4 bar, subsequently expanding the scrubbing solution in a first expansion stage, and removing a major proportion of $CO_2$ and sulfur compounds from the scrubbing solution as a gas stream to form a partially regenerated scrubbing solution;
   b) heating the partially regenerated scrubbing solution obtained in step a) to a temperature of at least 130° C. and compressing to a pressure of at least 4 bar, and expanding the partially regenerated scrubbing solution in a second expansion stage to a pressure that is at least 0.5 bar higher than an expansion pressure of the first expansion stage, and removing a major proportion of the $CO_2$ and sulfur compounds still present from the partially regenerated scrubbing solution as a gas stream;
   c) cooling the scrubbing solution removed in the second expansion stage to a temperature below 70° C. and expanding to standard pressure in a third expansion stage, and removing residual amounts of soluble $CO_2$ still present, and cooling to standard temperature as a completely purified scrubbing solution; and
   d) dividing the scrubbing solution removed after the first expansion stage or the second expansion stage into first and second partial streams, and returning the first partial stream in the circuit to the respective expansion stage and adjusting a temperature and a pressure thereof to conditions of the associated expansion stage, wherein residual amounts of sulfur compounds still present are removed from the first partial stream during the expansion and the second partial stream is further processed in accordance with step b) or step c); and
   subjecting the scrubbing solution to ultrasonic treatment during the first expansion stage.

8. A method of regenerating an amine-containing scrubbing solution obtained during gas purification and having $CO_2$ and sulfur compounds chemically bound therein, the method which comprises:
   a) heating a contaminated scrubbing solution to a temperature of at least 110° C. and compressing to a pressure of at least 4 bar, subsequently expanding the scrubbing solution in a first expansion stage, and removing a major proportion of $CO_2$ and sulfur compounds from the scrubbing solution as a gas stream to form a partially regenerated scrubbing solution;
   b) heating the partially regenerated scrubbing solution obtained in step a) to a temperature of at least 130° C. and compressing to a pressure of at least 4 bar, and expanding the partially regenerated scrubbing solution in a second expansion stage to a pressure that is at least 0.5 bar higher than an expansion pressure of the first expansion stage, and removing a major proportion of the $CO_2$ and sulfur compounds still present from the partially regenerated scrubbing solution as a gas stream;
   c) cooling the scrubbing solution removed in the second expansion stage to a temperature below 70° C. and expanding to standard pressure in a third expansion stage and removing residual amounts of soluble $CO_2$ still present, and cooling to standard temperature as a completely purified scrubbing solution; and
   d) dividing the scrubbing solution removed after the first expansion stage or the second expansion stage into first and second partial streams, and returning the first partial stream in the circuit to the respective expansion stage and adjusting a temperature and a pressure thereof to conditions of the associated expansion stage, wherein residual amounts of sulfur compounds still present are removed from the first partial stream during the expansion and the second partial stream is further processed in accordance with step b) or step c); and
   measuring a pH of the purified scrubbing solution and utilizing the measured pH as a control variable for adjusting a temperature of the contaminated scrubbing solution in the expansion stages.

9. The method according to claim 1, which comprises, in an expansion stage the ratio of the partial stream removed from the circuit to the amount fed in of contaminated scrubbing solution is 0.2 to 5.

* * * * *